No. 895,616.

A. BURIAN.
DRY SEPARATOR FOR CORN, GRAIN, SEMOLINA, FLOUR, BRAN, AND THE LIKE.
APPLICATION FILED AUG. 1, 1906.

PATENTED AUG. 11, 1908.

Witnesses
Wm. Snell
A. Glatt

Inventor,
Adolf Burian,
by Gartner Leuward,
attorneys.

UNITED STATES PATENT OFFICE.

ADOLF BURIAN, OF KLUČOV, AUSTRIA-HUNGARY.

DRY SEPARATOR FOR CORN, GRAIN, SEMOLINA, FLOUR, BRAN, AND THE LIKE.

No. 895,616.　　　Specification of Letters Patent.　　　Patented Aug. 11, 1908.

Application filed August 1, 1906. Serial No. 328,646.

*To all whom it may concern:*

Be it known that I, ADOLF BURIAN, a subject of the Emperor of Austria-Hungary, residing at Klučov, Kingdom of Bohemia, Austro-Hungarian Empire, have invented a certain new and useful Dry Separator for Corn, Grain, Semolina, Flour, Bran, and the Like, of which the following is such a full, clear, and exact description as will enable any one skilled in the art to which it appertains to make and use the same, reference being had to the accompanying drawings, forming part of this specification.

My invention relates to dry separators in which air suction is used, by which such particles, as are carried with the wind, are introduced into the casing of the separator, while the heavier particles fall down through the wind onto a moving table or grate, where they are separated from stones or pieces of iron or the like, the lighter particles which went with the wind into the casing of the separator being separated again and mechanically classified once in the suction air chamber before entering and passing through the suction fan, and afterwards the rest of it again in the pressure air chamber, where the outlet is controlled by a vertically swiveling valve-door, so that only the fine flour or the like passes through, while the bran or the like remains back and is deposited in said pressure air chamber.

The object of my invention is to provide an efficient and reliably operated appliance for controlling the separation of certain ground or granulated or grainlike and flourlike substances in a more accomplished and economical manner, than could be attained up to now. This object I accomplish by placing a suction fan in its casing between the suction and pressure air chambers, and by permitting the wind to rush into the suction chamber through several vertically superposed straight channels with gradually increasing velocity in each of them, while the grain falls vertically and successively through all the series of said air channels and is separated from all such particles which can be carried off by the wind into the suction air chamber, where the sharp wind loses its velocity and deposes the heavier part of the particles which were sucked in, while the lighter one is carried through the fan into the pressure air chamber, of which the outlet is regulated automatically by the vertically oscillating valve.

Figure 1:
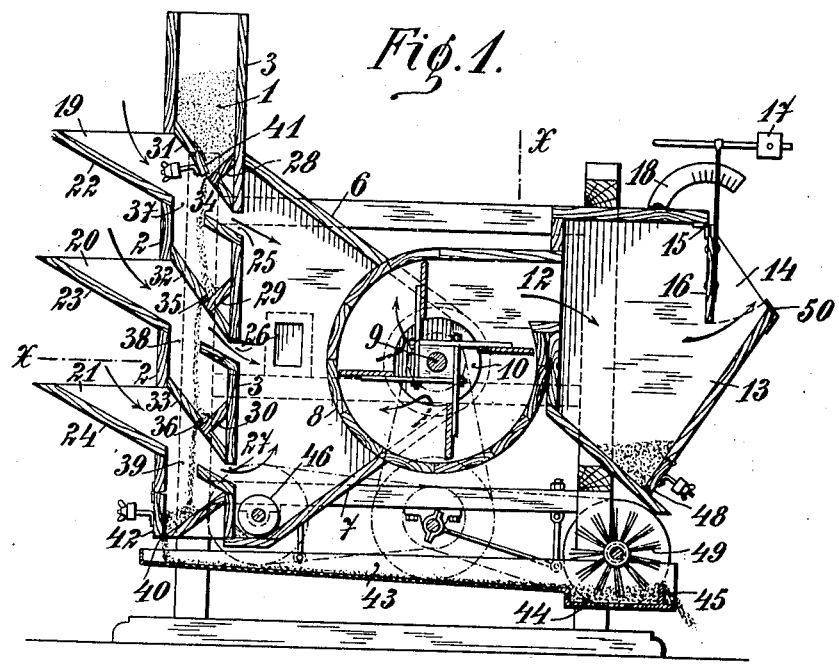
Figure 2:
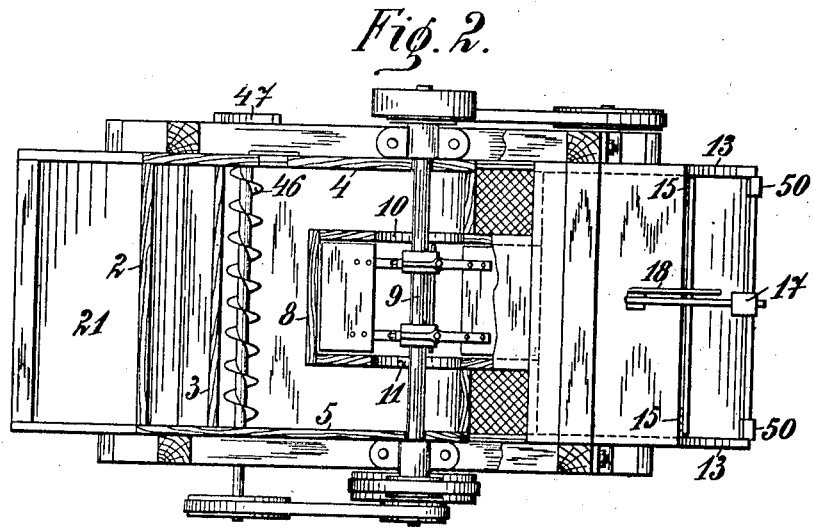

The separator is illustrated as an example of my invention in the accompanying drawing, in which Figure 1 is a vertical section of the entire machine; Fig. 2 is a top view of the machine, and partly a horizontal section on the line *x—x*, Fig. 1.

The grain or the like is fed into the hopper 1, and falls down through the regulated orifice 41, passes the funnel like wind-channel 19—25, and after that successively a number of similar wind-channels 20—26, 21—27, for instance, and falls finally onto the moving table 43, being cleansed during its said falling through the wind of all ingredients and such particles as could be carried off by the wind further on. It comes into each air channel nicely divided into a thin layer occupying the whole breadth of the channel, being regulated by the inclined walls 41—28, 29—35, 33—30, 27—42, onto which it falls successively through the orifices 37, 38, 39, which are provided in the bottom walls of said channels, the slits through which it is regulated being in the prolongation of the inclined walls 28, 29, 30 made at the lower end of the opposite inclined walls 41, 32, 33, as shown in Fig. 1. The funnel-like air chutes or channels 19—25, 20—26, 21—27, are mounted between the two vertical transverse walls 2 and 3 of the hopper 1, in front of the suction air chamber 4—5—6—7. Air enters by the broad inlets 19, 20, 21 into the said air-channels, increasing in velocity in the same ratio as their section diminishes, and enters into the air chamber by their comparatively small outlets 25, 26, 27. Entering into the air-chamber 4—5—6—7, the wind loses almost all its velocity, and drops the heavier particles, as for instance semolina or the like, which are carried from the casing at 47 by a worm 46 or any other appropriate transporting device, while the lighter particles are still sucked into the fan, which is placed at the pointed end of said suction air chamber. The wind is sucked in by the central orifices 10, 11 of its mantle 8 and is being thrown out through the outlet 12 of the fan, which is being rotated upon its axis 9 from outside. The wind with all the particles which did not fall down previously, enters through said outlet 12 into the pressure air chamber 13, where it loses again its velocity and lets fall down some of the heavier particles, like bran for instance, which from time to time may be taken out through the door 48. The outlet 14 of said pressure air chamber 13 is regulated by a valve-door 16, which hangs down vertically and swivels round its horizontal axis 15. It shuts the outlet 14 the more it is brought out from its vertical position in the direction of the dart, and therefore the more the stronger the wind blows from the fan. The outlet 14 would be completely closed, if the door valve 16 could be pressed against the stop 50, which limits its course. But the more the strong wind shuts valve 16 or rather the outlet 14, the less air will be sucked in by the ventilator and vice-versa. By means of a weight 17, which can be displaced upon its lever, or by an appropriate spring regulator, the facility with which the wind can more or less shut the door valve 16, can also be regulated and governed. The finest flour, dust or the like flows then through said outlet 14, and undergoes in many cases further separation.

The first class heavy particles, as for instance, corn, grain or the like, being mixed with stones, pieces of iron or the like, which fell onto the moving table 43, have further to be freed and separated from them. Said moving table is inclined and has on its lowest end a pocket 44, and a small wall 45 in front of it, so as to keep the grain partly back. An appropriate rotating mixer 49 continually mixes the grain in 44. Every stone or piece of iron falls therefore to the bottom in 44 and is retained by the small transverse wall 45, while the rest of the grain travels over it and is gathered in a thoroughly cleansed condition, free from stones and from pieces of iron, but without the help of magnets.

I am aware that, prior to my invention, separators have been made with air chambers, wind channels, weight or spring regulators with vertically swiveling valves, moving boards, operating together for the same purpose as in my present invention. I, therefore, do not claim such a combination broadly, but What I do claim as my invention, and desire to secure by Letters Patent, is:

1. In a dry separator, the combination with a suction air chamber, of a rotary suction fan, a casing surrounding the suction fan and partly inclosed in said chamber, said casing having an air outlet and also having air inlets opening into the air chamber and arranged one on each side of the suction fan, a hopper and a series of vertically alined inclined funnel-shaped chutes extending through the hopper transversely thereof and communicating at their reduced ends with said chamber, each chute having a restricted opening in its top wall and a larger opening in its bottom wall, substantially as described.

2. In a dry separator, the combination with a suction air chamber, of a rotary suction fan, a casing surrounding the suction fan and partly inclosed in said chamber, said casing having an air outlet and also having air inlets opening into the air chamber and arranged one on each side of the suction fan, a hopper and a series of vertically alined inclined funnel-shaped chutes extending through the hopper transversely thereof and communicating at their reduced ends with said chamber, each chute having a restricted opening in its top wall and a larger opening in its bottom wall, the top and bottom walls of said air chamber converging from points respectively above and below the reduced ends of said chutes to points respectively above and below the openings from said air chamber to the casing, substantially as described.

In testimony whereof I affix my signature in presence of two witnesses.

ADOLF BURIAN.

Witnesses:
 ARTHUR SCHWARZ,
 L. VOJAIELY.